United States Patent
Potrebic

(10) Patent No.: US 6,798,971 B2
(45) Date of Patent: Sep. 28, 2004

(54) SYSTEMS AND METHODS FOR PROVIDING CONTINUOUS RECORDING OF REPEATING PROGRAMMING

(75) Inventor: Peter J. Potrebic, Calistoga, CA (US)

(73) Assignee: Microsoft Corporation, Redmond, WA (US)

( * ) Notice: Subject to any disclaimer, the term of this patent is extended or adjusted under 35 U.S.C. 154(b) by 521 days.

(21) Appl. No.: 09/781,096

(22) Filed: Feb. 9, 2001

(65) Prior Publication Data

US 2002/0110352 A1 Aug. 15, 2002

(51) Int. Cl.[7] .................................................. H04N 5/91
(52) U.S. Cl. ............................................. 386/46; 386/86
(58) Field of Search ............................. 386/46, 83, 95, 386/112, 125; 725/138

(56) References Cited

U.S. PATENT DOCUMENTS

| | | | | |
|---|---|---|---|---|
| 5,614,940 A | * | 3/1997 | Cobbley et al. | 725/138 |
| 6,167,188 A | * | 12/2000 | Young et al. | 386/83 |
| 6,400,408 B1 | * | 6/2002 | Berger | 386/83 |
| 6,430,363 B2 | * | 8/2002 | Sasaki et al. | 386/112 |

* cited by examiner

*Primary Examiner*—Huy Nguyen
(74) *Attorney, Agent, or Firm*—Workman Nydegger

(57) ABSTRACT

Systems and methods for continuously and selectively recording a repeating program to provide a viewer instant access to a recent version of the repeating program without having to wait until the next start time, and to allow the viewer to only view the specific segments of the repeating program that the viewer desires to watch. Programming information used to control the recording of the repeating programs is obtained from an electronic programming guide ("EPG"). Alternatively, the programming information, such as information relating to emergency warnings, is not scheduled and thus is not included in a programming guide. Repeating programs may be divided into segments and an overlay may be used to allow a viewer to quickly and easily view a segment of interest. The recording can be performed by home entertainment systems that include one tuner or systems that include multiple tuners. When a plurality of tuners are available, a viewer may use one tuner to watch or record programming, while at the same time the other tuners may be used to perform the continuous recording of repeating programs.

29 Claims, 6 Drawing Sheets

SYSTEMS AND METHODS FOR PROVIDING CONTINUOUS RECORDING OF REPEATING PROGRAMMING

BACKGROUND OF THE INVENTION

1. The Field of the Invention

The present invention relates to systems and methods for providing a continuous recording of repeating programming. More specifically, the present invention is directed to systems and methods for continuously and selectively recording a repeating program to provide a viewer instant access to a recent version of the repeating program without having to wait until the next start time, and to allow the viewer to only view the specific segments of the repeating program that the viewer desires to watch.

2. The Prior State of the Art

Currently, home entertainment systems are able to receive a variety of different programming channels from various sources. The channels may include public, cable or satellite television programming that can be tuned by the home entertainment system upon selection by a user. After tuning to a selected channel, the current scheduled programming corresponding to the selected channel is displayed on the television screen of the home entertainment system.

Frequently the programming scheduled for a particular channel includes a short-term program such as a current news broadcast, stock report, weather forecast, sports update, or the like that provides a report on a specific topic. Generally the program is cyclic or repeating to provide continuously updating reports to inform the viewer as to the most recent developments on the topic of the program. At times, channels are dedicated exclusively to the airing of such repeating programs.

Generally, a viewer begins watching a repeating program after the program has already started. Therefore, when the viewer desires to watch the beginning of the program, he/she may have to wait up to one-half to one hour for the start of the repeating program to begin.

Similarly, when a viewer only desires to watch a particular segment of the repeating program and does not know when the segment will air, the viewer often ends up watching a large portion of the repeating program. For example, if the repeating program is an hour-long program that provides recent developments in national weather patterns and forecasts, and the viewer only desires to know what the five-day forecast is for his/her area, the viewer will begin watching the repeating weather program until the five-day forecast for his/her area is aired, which can take up to the full hour.

While home entertainment systems frequently include a VCR or other recording device for the recording of a program that can be watched at a more convenient time for the viewer, a VCR or other recording device is rarely used to record a repeating program because of its repeating nature. A viewer ends up either waiting until the next start time of the program, or if the repeating program has been recorded, watching a recording that may be several hours old, or more.

SUMMARY OF THE INVENTION

The present invention relates to systems and methods for providing a continuous recording of repeating programming. More specifically, the present invention is directed to systems and methods for continuously and selectively recording a repeating program to provide a viewer instant access to a recent version of the repeating program without having to wait until the next start time, and to allow the viewer to only view the specific segments of the repeating program that the viewer desires to watch.

Embodiments of the present invention relate to an intelligent system that continuously records a repeating program to provide a viewer instant access to the most recently aired version of the program. By way of example, a one-half hour repeating news program, such as one aired on a news network on cable television, is continuously recorded and temporarily stored so that there is always at least the most recent, complete version of the program. If the news program begins at the top and bottom of each hour, a viewer who wishes to view the program at 5:13 p.m., can begin viewing the recorded program that began at 4:30 p.m. Alternatively, the system can enable the viewer to begin watching the 5:00 p.m. version, with the remaining portion of the 5:00 p.m. version being recorded as the viewer watches the beginning portion. In this manner, the viewer can always view a recent version of the repeating program without having to wait until the next start time.

The information specific to the repeating programs may be obtained from a variety of sources. In one embodiment, programming information is obtained from an electronic programming guide ("EPG"), which provides such information as the programming start and stop times. A detailed EPG may also include data that splits a program into various segments. For example, in the case of a repeating news program the individual segments may include a national news segment, a local news segment, a weather segment, a stock market segment, and a sports segment. Alternatively, the division of a repeating program into segments may be performed by the system. The segment information may be used as an overlay of a recorded program to allow a viewer to quickly and easily view the segment of interest.

In another embodiment, the programming information such as information relating to emergency warnings is not included in an EPG. Instead, repeating updates on emergency conditions are received directly by the system and continuously recorded in order to allow a viewer to have access to the most current information at any one time.

Embodiments of the present invention include home entertainment systems that include one tuner, or alternatively systems that include multiple tuners. Where a home entertainment system includes a plurality of tuners, the viewer may use a tuner to watch or record programming, while at the same time the other tuners may be used to perform the continuous recording of repeating programs.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
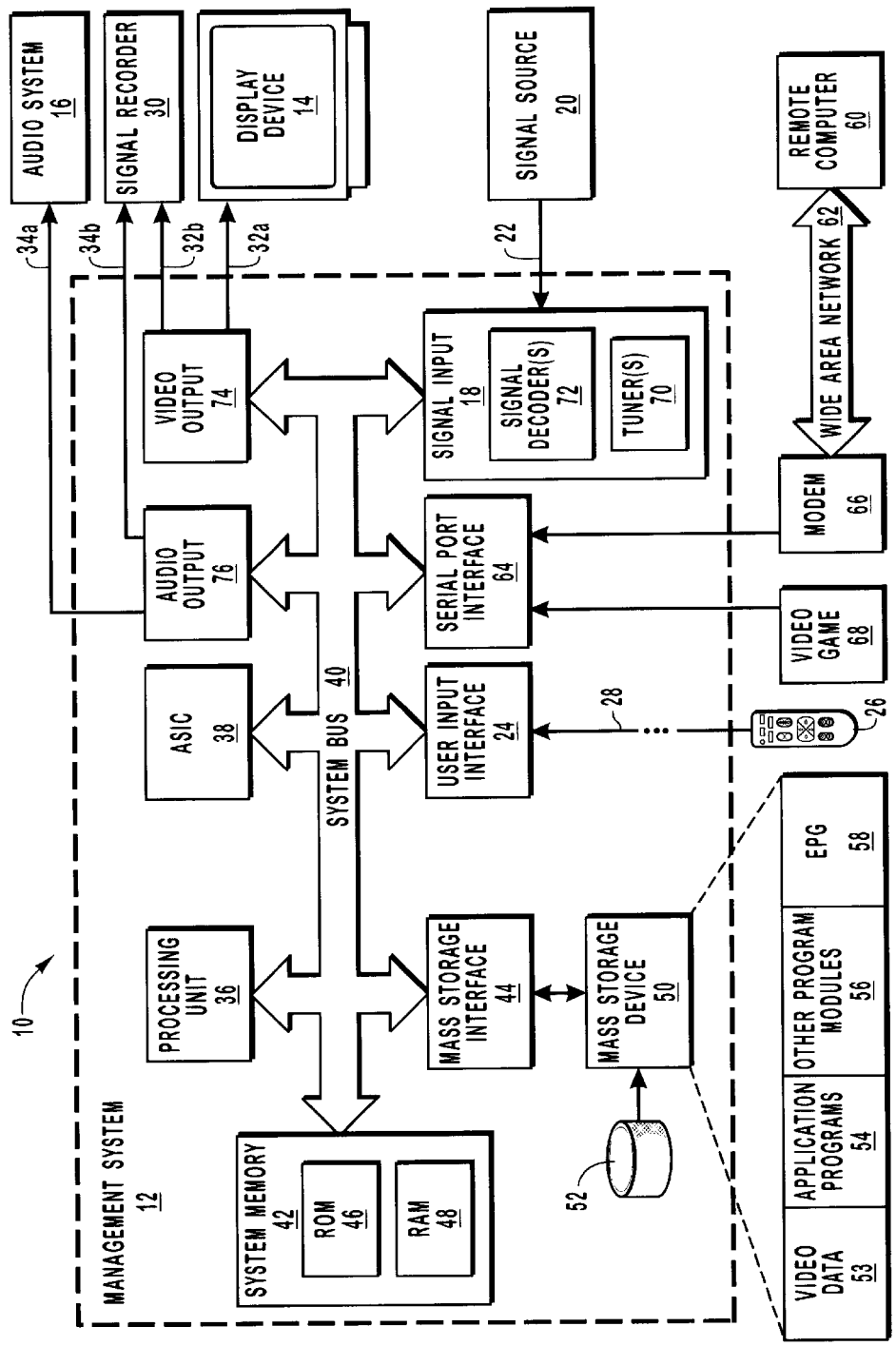
FIG. 1 illustrates an exemplary home entertainment system that provides a suitable operating environment for the present invention.

The present invention relates to systems and methods for providing a continuous recording of repeating programming. More specifically, the present invention is directed to systems and methods for continuously and selectively recording a repeating program to provide a viewer instant access to a recent version of the repeating program without having to wait until the next start time, and to allow the viewer to only view the specific segments of the repeating program that the viewer desires to watch.

The embodiments of the present invention may comprise a special purpose or general purpose computer including various computer hardware, as discussed in greater detail below. Set top boxes that enhance the capabilities of conventional televisions represent an example of a special purpose computer. The embodiments may further comprise multiple computers linked in a networked environment.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

FIG. 1 and the corresponding discussion are intended to provide a general description of a suitable environment in which the invention may be implemented. In the discussion, reference is made to a home entertainment system that may be used for displaying and/or recording programming. For purposes of this description and in the claims, a "home entertainment system" may be a display unit, such as a television screen, coupled to a processing device for performing the data processing steps disclosed herein, or may include any number of interconnected consumer electronic devices, one of which having a processing device for performing the data processing steps disclosed herein. Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a set-top box that serves as an Internet terminal, and any other device capable of processing data as described herein. Furthermore, the term "home entertainment system" is to be understood as a term that broadly describes a television-viewing environment, whether it is located in a viewer's home, at a place of business, in the public, or at any other location. Also for purposes of this description and in the claims, the term "programming" includes both the viewable portions of moving image data and its associated sound data.

In one embodiment, the present invention is implemented in a system that uses a conventional television screen or other display unit to display information and includes a WebTV® set-top box or a similar Internet terminal that has been adapted to perform the operations that include composing, sending and receiving email, browsing the World Wide Web ("Web"), accessing other segments of the Internet, and otherwise displaying information. An Internet terminal typically uses standard telephone lines, Integrated Services Digital Network (ISDN) lines, cable lines associated with cable television service, or the like to connect to the Internet or other wide area networks.

FIG. 1 illustrates a home entertainment system 10 that includes a management system 12, a display device 14 and an audio system 16. Management system 14 may be a set-top box or Internet terminal that has been adapted to perform the operations disclosed herein. Management system 12 may be integrally positioned with or separate from display device 14, which may be a high definition television display, a standard television display, a flat panel display, a projection device, a high definition television display, a computer monitor, or any other device capable of displaying viewable video image data. Audio system 16 may be a speaker, a stereo system, or any device capable of emitting sound data, and similarly may be integrally positioned with or separate from display device 14.

Management system 12 includes a signal input 18, which receives programming from a signal source 20. The programming is transmitted from signal source 20 to signal input 18 via a programming input line 22, which can be a cable or optic connection, a terrestrial antenna system, a satellite system, or any device or system capable of transmitting programming to home management system 12.

The signal source 20 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF or VHF), and the like.

While FIG. 1 illustrates home entertainment system 10 as having a single programming input line 22 and a single signal source 20, there can instead be a plurality of programming input lines that transmit programming from a plurality of signal sources. In such embodiments, the home entertainment system may receive the programming from one signal source or from a plurality of signal sources at a time.

Management system 12 also includes a user input interface 24, which receives input from an input device 26, such as a remote control, keyboard, microphone, or any other device capable of generating electronic instructions for management system 12. Input device 26 is communicatively coupled to management system 12 over an input link 28 so as to enable such control. Input device 26 generates electronic instructions over input link 28 in response to preprogrammed data or in response to a viewer pressing buttons on input device 26. Input device 26 may also control Web browser software within management system 12 as when management system 12 is a set-top box or an Internet terminal that has been adapted to perform the operations disclosed herein. For instance, input device 26 may be programmed to turn on home entertainment system 10 and to tune management system 12 to a channel.

FIG. 1 illustrates a signal recorder 30, which is capable of receiving video and/or audio data and recording the data on a storage medium. Video signals are transmitted to signal recorder 30 and/or display device 14 by video image link 32, examples of which include a radio-frequency ("RF") link, an S-video link, a composite link, or any other equivalent form of video image link. Similarly, audio link 34 transmits audio data from management system 12 to audio system 16 or to signal recorder 30.

The operation of management system 12 is controlled by a central processing unit ("CPU"), illustrated as processing unit 36, which is coupled to an application-specific integrated circuit ("ASIC") 38 and uses computer-executable instructions implemented in software and/or hardwired logic circuitry. Processing unit 36 and ASIC 38 are coupled via a system bus 40, which also interconnects various other system components, such as the system memory 42, mass storage interface 44, user interface 24 and signal input 18. Processing unit 36 executes software designed to implement features of management system 12 including features of the present invention. ASIC 38 contains circuitry that is used to implement certain functions of management system 12. Instructions, data, and other software necessary for the operation of processing unit 36 and ASIC 38 may be stored in the system memory 42, such as in read-only memory ("ROM") 46 and/or in random-access memory ("RAM") 48, and/or in a mass storage device 50, which is coupled to mass storage interface 44. ROM 46, RAM 48 and mass storage device 50 are communicatively coupled to ASIC 38 so as to be readable by ASIC 38 and so that data may be written from ASIC 38 to RAM 48 and possibly mass storage device 50.

Mass storage device 50 may be a magnetic hard disk 52 or any other magnetic or optical mass memory device that is capable of storing large amounts of data. Any desired computer-readable instructions or data, including application programs 54, other program modules 56, and an electronic programming guide ("EPG") 58, which specifies the broadcast times and channels of programs can be stored in mass storage device 50. Mass storage device 50 can also be used to record video data 53, in which case, management system 12 generates as a digital video recorder.

EPG data may be obtained in a variety of manners. For instance, the EPG data can be supplied to management system 12 by a remote computer 60, such as a server, and stored on mass storage device 50. The EPG data is supplied on a regular basis to continually maintain a current schedule of programming at the management system 12. Where home entertainment system 12 is associated with the Internet, the data included in the EPG may be downloaded from the Internet. Alternatively, the EPG may delivered to the home entertainment system by using a direct-dial communication over standard telephone lines, or by using data transmission over the cable television infrastructure, a satellite network, an over-the-air broadcasting or any other available medium.

In the embodiment where management system 12 is associated with the Internet, management system 12 communicates with a remote computer 60 via a wide area network ("WAN") 62 by including a serial port interface 64 that is interposed between the system bus 40 and a modem 66, a wireless link, or other means for establishing communications over a WAN that may be internal or external to management system 12. Management device 12 is also capable of transmitting information via the Internet by direct-dial communication over standard telephone lines, or by using any other available communication medium.

While serial port interface 64 may be utilized to connect a modem 66 for communicating across a WAN, serial port interface may also be utilized to connect other consumer electronic devices, such as video game 68, and/or various input devices, such as a keyboard (not shown) or joystick (not shown), to management device 12.

Referring now to signal input 18, if the signal on programming input line 22 includes multiple channels, a tuner 70 included in signal input 18 tunes to a selected channel in the signal. Multiple tuners 70 can be used to provide enhanced viewing features, such as picture, recording one channel while viewing another, and recording a plurality of channels simultaneously. A signal decoder 72 converts video data from an analog format to a digital format, or from a digital format to an analog format, in the event that ASIC 38 and tuner 70 employ different formats. Video decoder 72 also decodes video data from a compressed video format (e.g. MPEG). In embodiments where the management system 12 includes multiple tuners 70, management system 12 may also include multiple signal decoders 72 to perform the operations disclosed herein.

Management system 12 also includes a video output 74, which may include a video encoder and/or a video converter. The video encoder assigns a code to frames of video data that are transmitted across a video image link 32 and switches between analog and digital formats as necessary. Similarly, audio output 76 can include an audio converter to provide the necessary switching between analog and digital formats.

While FIG. 1 and the corresponding discussion above provide a general description of a suitable environment in which the invention may be implemented, it will be appreciated that the features of the present invention disclosed herein may be practiced in association with a variety of different system configurations.

Figure 2:
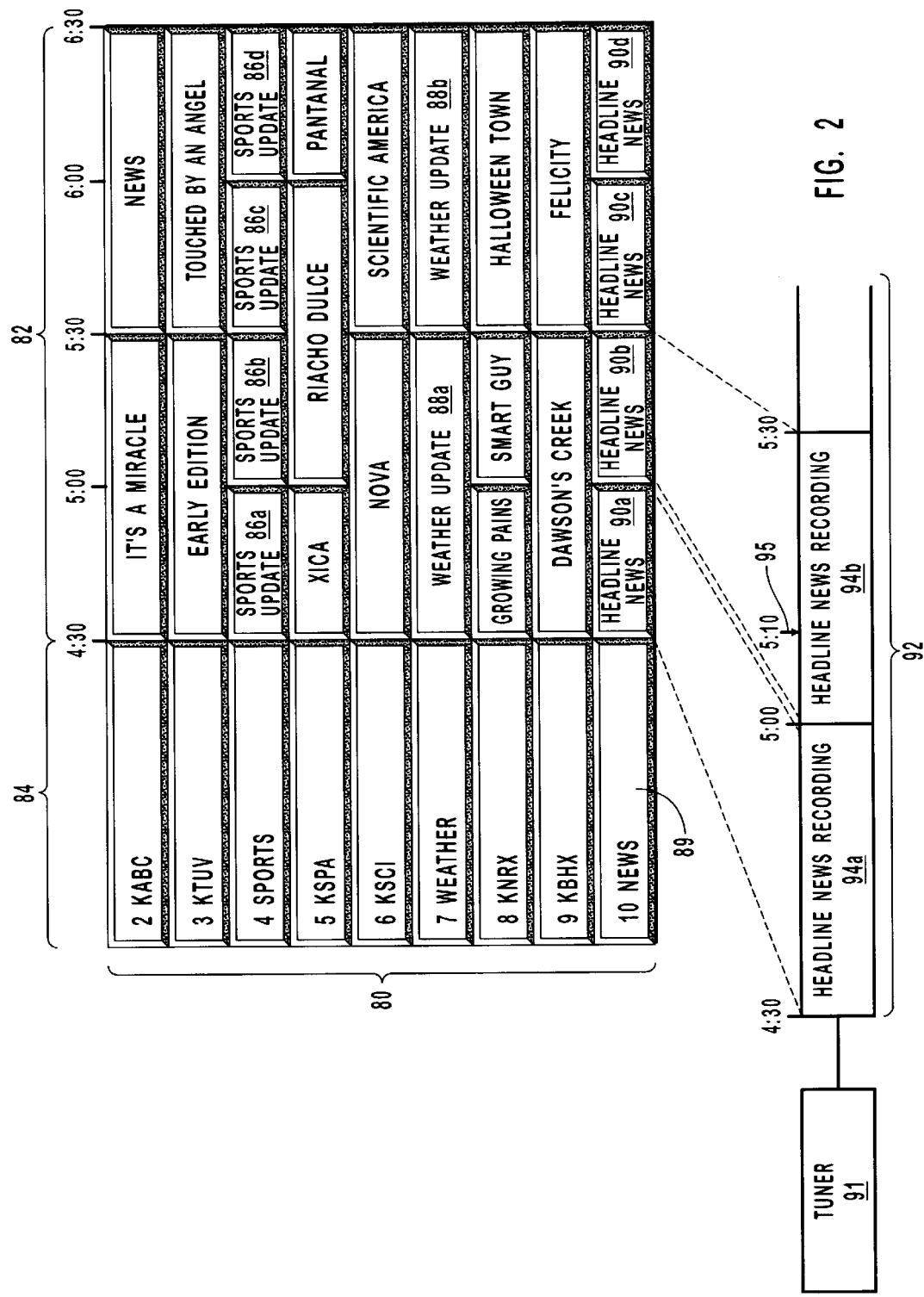
FIG. 2 illustrates an embodiment of the present invention for which a repeating program is tuned by an otherwise idle tuner and is continuously recorded onto a storage device of a home entertainment system.

With reference to FIG. 2, an embodiment of the present invention is illustrated in which an otherwise idle tuner is used to continuously record a repeating program on a storage device of a home entertainment system in order to provide a viewer instant access to a recent version of the repeating program without requiring the viewer to wait until the next start time for the program. For purposes of this disclosure and in the claims, "an otherwise idle tuner" refers to a tuner of a home entertainment system that would be in an idle or unused state if no continuous recording of a repeating program was being conducted.

In accordance with the embodiment of FIG. 2, a viewer may selectively identify a repeating program from an EPG that is to be continuously recorded by an otherwise idle tuner of a home entertainment system. When the selected program is scheduled to air, the program is recorded onto a recording medium, such as a mass storage device, and can be accessed by the viewer in order for the recorded program to be displayed on a display device of the home entertainment system. The mass storage device onto which the program is recorded can be mass storage device 50 of FIG. 1 or an external device, such as signal recorder 30.

FIG. 2 illustrates an EPG 80, tuner 91 and storage device 92 from a home entertainment system. EPG 80 provides a current schedule of programming, is stored on a mass storage device, and is accessible by a viewer. Furthermore, EPG 80 includes programming information 82 and corresponding channel information 84. Program information 82 identifies the title, start time, and stop time of each program scheduled to air on a channel during the two-hour period from 4:30 to 6:30. Channel information 84 identifies each channel by number, name, and/or call sign.

Frequently, programming scheduled to air on a particular channel includes a program that is repeated on an ongoing basis, with each repeated version of the program providing more current information. Examples of such repeating programs include a news broadcast, a stock report, a weather forecast, a sports update, and the like. Generally, repeating programs are cyclic in nature to provide continuously updating reports that inform the viewer as to the most recent developments on the topic of the program. In FIG. 2, examples of such repeating programs include Sports Update 86, Weather Update 88, and Headline News 90.

A news channel 89 is dedicated to the airing of repeating news reports, illustrated as Headline News 90, which may include individual segments of a national news report, a local news report, a weather forecast, a stock update and a sports update during a 30-minute period of time. One version, Headline News 90a, is scheduled to air from 4:30–5:00. Another version, Headline News 90b, is scheduled to air from 5:00–5:30. A subsequent version, Headline News 90c, is scheduled to air from 5:30–6:00. A further version, Headline News 90d, is scheduled to air from 6:00–6:30. Each subsequent version of Headline News 90 provides information that is more current than the previous version.

A viewer of a home entertainment system, such as home entertainment system 10 of FIG. 1, may employ the present invention to selectively maintain a local copy of a recent version of a repeating program. The viewer selects a repeating program from EPG 80, such as Headline News 90, to be recorded on storage device 92 of the viewer's home entertainment system. Thus, when a version of a selected program airs, the program is automatically recorded on storage device 92 if the tuner is otherwise idle. Thus, if the tuner is not being used to tune to a channel for watching or recording programming, the tuner may be used to perform continuous recording.

Therefore at 4:30, which is the start time for Headline News 90a, if tuner 91 is idle Headline News 90a is recorded on storage device 92. Furthermore, if tuner 91 remains otherwise idle from 4:30–5:00, the entire program of Headline News 90a is recorded onto storage device 92, as indicated by Headline News recording 94a.

The next start time for Headline News 90 is 5:00. Therefore, as above, if the tuner remains otherwise idle at 5:00, Headline News 90b is recorded on storage device 92 so long as tuner 91 remains otherwise idle. Therefore, if tuner 91 remained otherwise idle from 5:00–5:30, the entire program of Headline News 90b is automatically recorded on storage device 92, as illustrated by Headline News recording 94b. Once the entire amount of Headline News 90b has been recorded on storage device 92, Headline News recording 94a is identified as being a past version and therefore may be discarded since a more recent version of the program is saved in its entirety as Headline News recording 94b. The manner in which discarding a previous version (i.e., Headline News recording 94a) is performed is not critical, and can include actively deleting the recorded video data or designating the associated segment of the mass storage device to be overwritten with a later version of the repeating program or any other program.

In order to prevent a series of recordings of repeating programs from filling an entire hard disk or other mass storage device, a segment of the mass storage device can be designated for use in recording repeating programs. For instance, a segment of storage device 92 that is large enough to store one to two hours of programming data associated with repeating programs can be earmarked for this purpose. In this case, after the entire segment of storage device 92 has been filled with repeating programs, an additional version of the repeating program can be recorded by overwriting one of the previous versions recorded in the segment of storage device 92. For example, if a one-hour segment of storage device 92 has been designated for use in recording repeating programs, and Headline News 90c were to be recorded at 5:30, the recording of Headline News 90c is performed by overwriting Headline News recording 94a. Managing the storage device 92 in this manner avoids filling the entire storage device with repeating programs, while ensuring that a completed version of the repeating program is available for playback at any time.

In a further embodiment, if while in the process of automatically recording Headline News recording 94b, a viewer turns on the home entertainment system to watch programming at 5:10, as indicated by arrow 95, the recording of Headline News recording 94b is stopped at 5:10, since tuner 91 is no longer otherwise idle. The viewer can then access the most recent Headline News program that was saved in its entirety on storage device 92, namely Headline News recording 94a. Upon the viewer's request, the home entertainment system displays Headline News recording 94a on the television. In such a situation, Headline News recording 94b, which was interrupted during its recording, is identified as being incomplete and can therefore be discarded.

In another embodiment, a viewer who turns on the home entertainment system at 5:10 as indicated by arrow 95 is given the option to discontinue the recording of Headline News recording 94b or to display the current recording of the Headline News program from the beginning. If the viewer decides to display the current recording of the Headline News program, tuner 91 continues to be tuned to news channel 89 and the recording of Headline News 90b continues until 5:30 so as to be recorded in its entirety. Meanwhile, Headline News recording 94b is displayed on the home entertainment system starting at its beginning. Thus, the viewer can watch the entire Headline News recording 94b from 5:10–5:40, and nothing would be missed, even though the viewer starts watching 10 minutes after Headline News 90b was scheduled to air on news channel 89.

Figure 3:
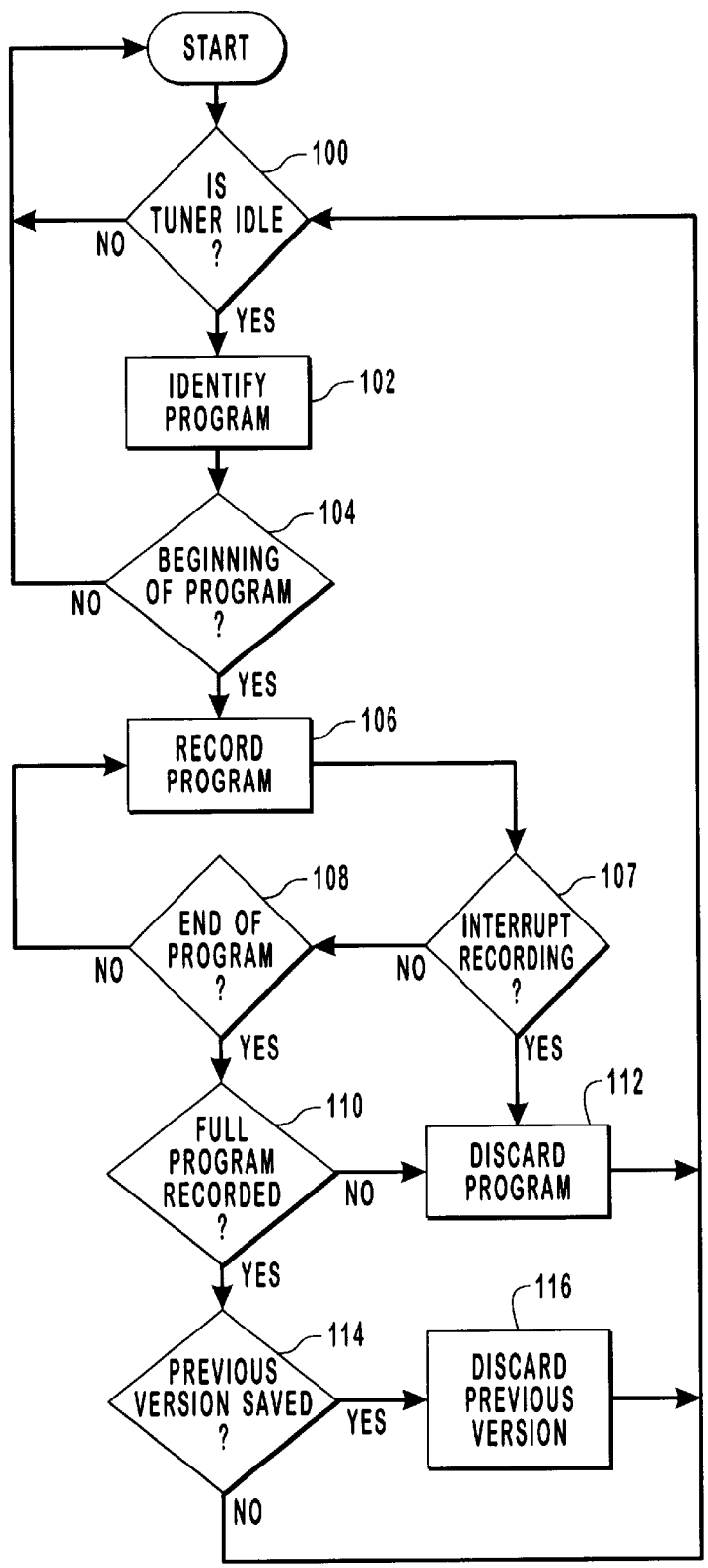
FIG. 3 is a flowchart that provides an exemplary implementation of tuning an otherwise idle tuner to a repeating program and recording the program on a storage device.

The flowchart of FIG. 3 illustrates an exemplary implementation of tuning an otherwise idle tuner to a repeating program and recording the program on a storage device so that a viewer may access the program. In FIG. 3, execution begins at decision block 100 for a determination as to whether or not a tuner of the home entertainment system is otherwise idle. If a tuner is not otherwise idle execution returns back to "start" in order to wait until a tuner is otherwise idle in order to be used to continuously record a repeating program.

Alternatively, if it is determined at decision block 100 that a tuner of the home entertainment system is otherwise idle, execution proceeds to step 102 to identify a program for which continuous recording will be performed. The program may be selected by a user and identified from an EPG. An example of such a program is Headline News 90 of FIG. 2. Execution then proceeds to decision block 104 for a determination as to whether or not the current instant in time is the beginning of the identified program. If the current instant in time is not the beginning of the program, execution returns back to start in order to ensure that the tuner remains idle and to determine the next start time of the repeating program in order that the repeating program may be recorded in its entirety.

Once it is determined at decision block 104 that the current instant in time is the beginning of the program, execution proceeds to step 106 where the program is recorded on a local storage device of the home entertainment system. At decision block 107, a determination is made as to whether or not to interrupt the recording. An interruption is made to the recording if, for example, a request was made by a user to tune the otherwise idle tuner to a channel. If such a user request was made, the recording would be interrupted, the recorded program that was interrupted is discarded at step 112, and execution returns back to decision block 100. Alternatively, if it is determined at decision block 107 that the recording is not to be interrupted, execution proceeds to decision block 108, which determines whether or not the current instant in time is the end of the program. If the current instant in time is not the end of the program, execution returns back to step 106 to continue recording the program so that the program may be recorded in its entirety. However, if the current instant in time is the end of the program, execution proceeds to decision block 110 for a determination as to whether or not the full program has been recorded the local storage device. In order for the full program to be recorded, the tuner must have remained in an otherwise idle state throughout the time the identified program aired. Furthermore, such occurrences of a disconnection of the signal, a disconnection of the power, etc. may prevent the entire program from being recorded.

If at decision block 110 it is determined that the full program was not recorded, step 112 discards the incomplete program from the local storage device and execution returns back to decision block 100. Alternatively, if at decision block 10 it is determined that the full program was recorded, execution proceeds to decision block 114 for a determination as to whether or not a previous version of the program was saved on the local storage device.

If at decision block 114 it is determined that a previous version was saved on the local storage device, the previous version is discarded at step 116 so as to only maintain the most current version of the program in its entirety and execution returns back to decision block 100. However, if it is determined that a previous version of the program was not saved on the local storage device, execution returns directly to decision block 100.

Figure 4:
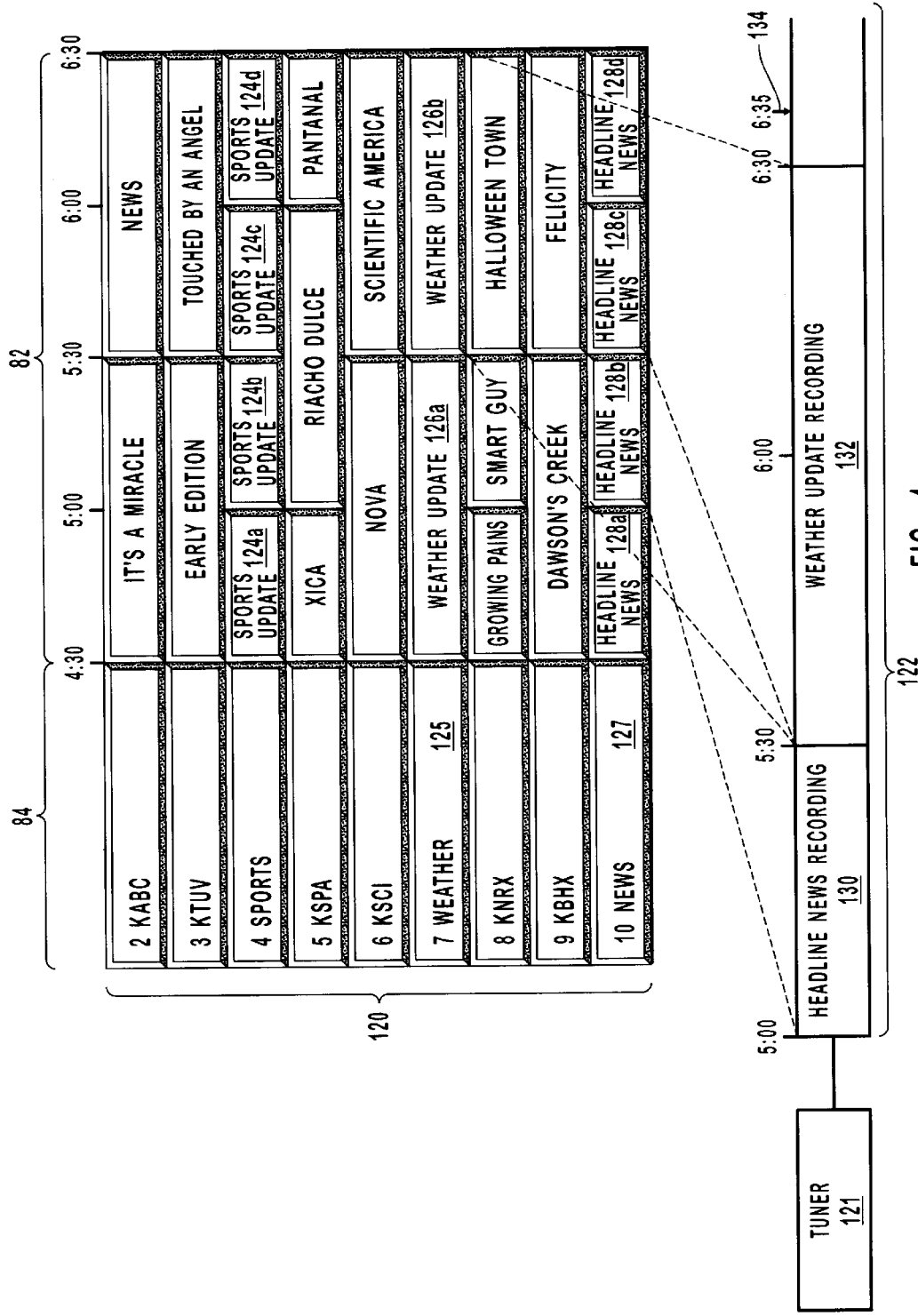
FIG. 4 illustrates an embodiment of the present invention for which a tuner and a mass storage device of a home entertainment system are used to continuously record multiple repeating programs.

With reference to FIG. 4, an embodiment of the present invention is illustrated for which a tuner and a storage device of a home entertainment system are used to continuously record multiple repeating programs. A viewer selectively identifies a plurality of repeating programs that are to be continuously recorded by an otherwise idle tuner of a home entertainment system. When the selected repeating programs are scheduled to air, the programs are recorded onto a recording medium, such as a local storage device, and can be accessed by the viewer in order for the recorded program to be displayed on a display device of the home entertainment system.

FIG. 4 illustrates an EPG 120, a tuner 121, and storage device 122 of a home entertainment system. EPG 120 includes a variety of scheduled programming, including several repeating programs, such as Sports Update 124, Weather Update 126 and Headline News 128. In FIG. 4, a viewer of a home entertainment system has selected to have Headline News 128 and Weather Update 126 continuously recorded on the home entertainment system.

A news channel 127 is dedicated to the airing of repeating news reports, illustrated as Headline News 128, which may include national news reports, local news reports, weather forecast, a stock update and a sports update during a 30 minute period of time. One version, Headline News 128a, is scheduled to air from 4:30–5:00. Another version, Headline News 128b, is scheduled to air from 5:00–5:30. A subsequent version, Headline News 128c, is scheduled to air from 5:30–6:00. A further version, Headline News 128d, is scheduled to air from 6:00–6:30. With each subsequent version of Headline News 128, provides information that is more current than a previous version.

Similarly, a weather channel 125 is dedicated to airing programs that are related to the weather. The scheduled programming for weather channel 125 includes a repeating version of a Weather Update 126, which provides current reports on national and local weather patterns and forecasts. According to EPG 80, each weather report is scheduled to air for one hour, with one version, Weather Update 126a, scheduled to air from 4:30–5:30 and another version, Weather Update 126b, scheduled to air from 5:30–6:30. As with the news reports, each subsequent version of Weather Update 126 includes weather patterns and forecasts that are more recent than any of the previous versions.

In order to illustrate how multiple repeating programs can be continuously recorded, the following example is presented. At 4:30, tuner 121 of the home entertainment system is otherwise in use, so neither Headline News 128a nor Weather Update 126a is recorded onto storage device 122. At 5:00 tuner 121 is determined to be otherwise idle, Weather Update 126a is in the middle of being aired, and Headline News 128b is beginning a new version of its program. Since Weather Update 126a is in the middle of being aired and cannot be recorded in its entirety, it is not recorded on storage device 122. However, because the start time for Headline News 128b is 5:00, tuner 121 tunes to news channel 127 and Headline News 128b is recorded on storage device 122.

At 5:30 tuner 121 is still otherwise idle and thus can be used to continuously record a repeating program. However, both Weather Update 126b and Headline News 128c have 6:00 start times. Therefore a determination is made by the system as to which of the repeating programs has a more recently saved version on storage device 122. Of the programs selected for continuous recording by the user, Headline News 128 has a more recent version saved on storage device 122 and therefore tuner 121 is tuned to weather channel 125 and Weather Update 126b is recorded on storage device 122 from 5:30 to 6:30. At 6:35, a viewer powers up the home entertainment system as shown at arrow 134 and thus has access to both view Headline News recording 130 and Weather Update recording 132 on storage device 122.

Figure 5:
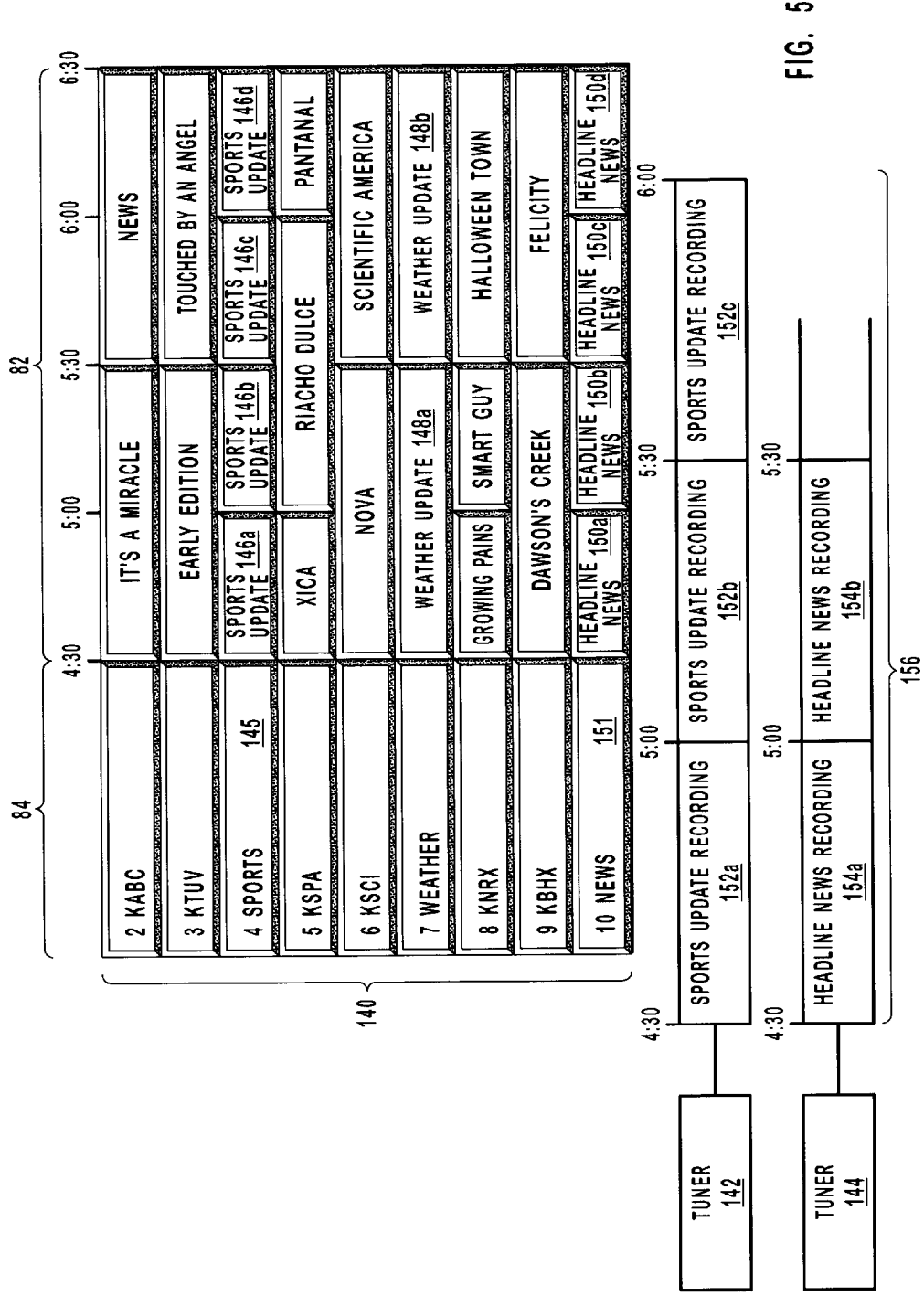
FIG. 5 illustrates an embodiment of the present invention for which multiple tuners of a home entertainment system may be employed to continuously record repeating programs on a storage device.

With reference to FIG. 5, an embodiment of the present invention is illustrated for which multiple tuners of a home entertainment system may be employed to continuously record repeating programs on a storage device. A viewer selectively identifies one or more repeating programs and one or more tuners are used to perform the continuous recording while in an otherwise idle state.

FIG. 5 illustrates tuners 142 and 144, and a storage device 156 of a home entertainment system. EPG 140 includes a variety of scheduled programming, including several repeating programs, such as Sports Update 124, Weather Update 126 and Headline News 128. In FIG. 5, a viewer of a home entertainment system has selected to have Sports Update 146 and Weather Update 148 be continuously recorded on his/her home entertainment system.

Sports channel 145 is dedicated to airing programs that are related to sporting activities. The scheduled programming for sports channel 145 includes a repeating version of a Sports Update 146, which provides current sports scores and reports. According to EPG 140, a repeating version is scheduled to air every 30 minutes. One version, Sports Update 146a, is scheduled to air from 4:30–5:00, another version, Sports Update 146b, is scheduled to air from 5:00–5:30, a subsequent version, Sports Update 146c, is scheduled to air from 5:30–6:00, and a further version, Sports Update 14D, is scheduled to air from 6:00–6:30. Each subsequent version of Sports Update 146 includes one or more sports scores and/or reports that are more recent than any of the previous versions.

Similarly, a news channel 151 is dedicated to the airing of repeating news reports, illustrated as Headline News 150, which may include national news reports, local news reports, weather forecast, a stock update and a sports update during a 30 minute period of time. One version, Headline News 150a, is scheduled to air from 4:30–5:00. Another version, Headline News 150b, is scheduled to air from 5:00–5:30. A subsequent version, Headline News 150c, is scheduled to air from 5:30–6:00. A further version, Headline News 150d, is scheduled to air from 6:00–6:30. With each subsequent version of Headline News 150, provides information that is more current than a previous version.

In order to further illustrate how multiple repeating programs can be continuously recorded, the following example is presented. At 4:30, tuners 142 and 144 are both determined to be idle. Therefore tuner 142 is used to tune to the sports channel 145 in order to record Sports Update 146a on storage device 156 until 5:00, as illustrated by Sports Update recording 152a. Similarly, tuner 144 is used to tune to the news channel 151 in order to record Headline News 150a from 4:30 until 5:00 on storage device 156, as illustrated by Headline News recording 154a.

At 5:00, tuners 142 and 144 are still idle and therefore are respectively used to record Sports Update 146b and Headline News 150b on storage device 156, as illustrated by Sports Update recording 152b and Headline News recording 154b. Then, since Sports Update 146b and Headline News 150b have been recorded in their entirety, Sports Update recording 152a and Headline News recording 154a are discarded.

At 5:30, tuner 144 is no longer otherwise idle and therefore is not used to perform continuous recording. The viewer may use tuner 144 to tune to another channel in order to watch the programming associated with that tuned channel, while at the same time access Sports Update 152b or Headline News 154b. Tuner 142 remains otherwise idle and continues to record Sports Update 146. Therefore, from 5:30 until 6:00 Sports Update 146c is recorded on the mass storage device of the home entertainment system as Sports Update recording 152c. At 6:00, if tuner 144 remains in use so as to not be available for continuous recording, tuner 142 tunes to the news channel 151 and records Headline News 150d onto storage device 156, since the saved version of Sports Update 146 is more recent than the saved version of Headline News 150.

Figure 6:
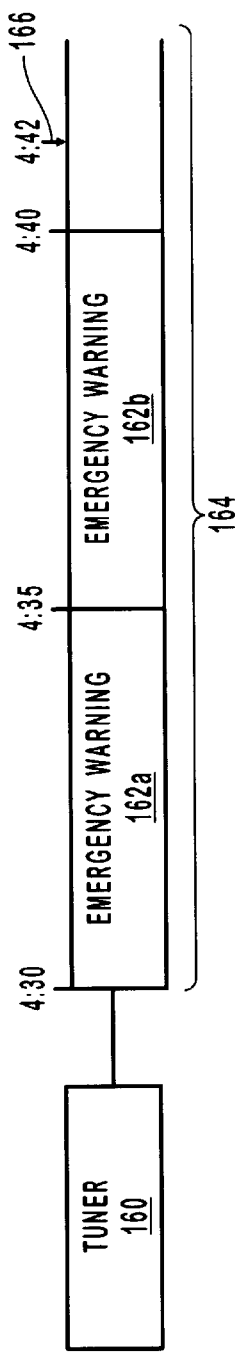
FIG. 6 illustrates an embodiment of the present invention for automatically and continuously recording repeating programs that are not scheduled on an EPG.

With reference to FIG. 6, an embodiment of the present invention for performing continuous recording is illustrated which includes a repeating program that is not scheduled in an EPG. Repeating programs that are spontaneous notices/updates to the public are not included in an EPG. Such spontaneous notices/updates include emergency warnings that are repeatedly broadcast to warn and inform individuals of a potential for the occurrence of a natural disaster, such as a flood, a fire, a tornado, a hurricane, etc. Emergency warnings are not scheduled in an EPG since they are broadcast only when the potential is high for a natural disaster to occur in the area. Frequently the emergency warnings are brief, reoccurring updates. Thus, such repeating programs are continuously recorded through the use of an otherwise idle tuner when the emergency warnings are broadcast to allow a viewer instant access to a recent version of the warning.

In order to further illustrate how multiple repeating programs can be continuously recorded, the following example is presented. FIG. 6 illustrates a tuner 160 and a storage device 164 of a home entertainment system. At 4:30 it is determined that tuner 160 is otherwise idle and so an emergency warning is recorded on storage device 164 from 4:30 to 4:35, as illustrated by emergency warning 162a. At 4:35, tuner 160 again determined to be otherwise idle and so the next emergency broadcast, illustrated as emergency warning 162b is recorded on storage device 164 from 4:35 until 4:40.

At 4:42, illustrated by arrow 166, a viewer powers up the home entertainment system and tunes the tuner 160 to a channel. As a result, tuner 160 is no longer in an otherwise idle state and therefore cannot continue to be used to perform continuous recording of a repeating program. However, because of the recording performed of the repeating program, the viewer has access to the most recent recording of the warning, namely emergency warning 162b.

Figure 7:
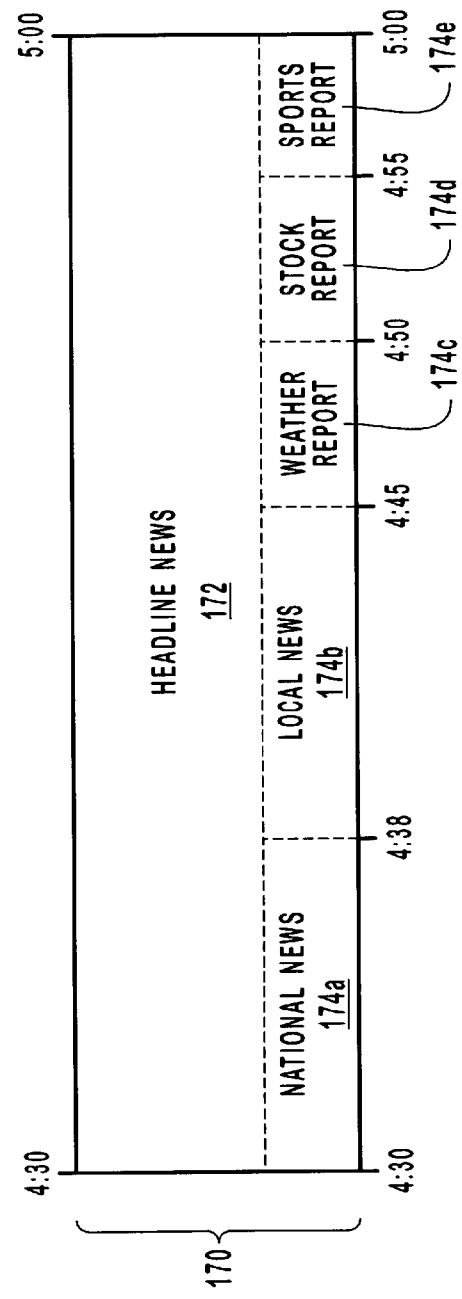
FIG. 7 illustrates an embodiment of the present invention for which a repeating program that is continuously recorded is indexed according to its individual segments.

With reference to FIG. 7, an embodiment of the present invention is illustrated for which a repeating program that is continuously recorded is indexed into individual segments. Frequently, programming that is repeating in nature has a particular order in which the information is presented. By way of example, a news broadcast may begin with a report on the national news, followed by a report on the local news, a report on the weather, a stock report, and may conclude with a sports report. Therefore, an embodiment of the present invention overlays an index that may be obtained from an EPG or is approximated by the system while the news broadcast is recorded.

FIG. 7 illustrates a repeated program, Headline News 172, which was recorded from 4:30 to 5:00 on storage device 170 after a tuner was determined to be otherwise idle. An index is overlaid on the recording of Headline News 172 to indicate that Headline News is broken up into segments, which include a national news segment 174a from 4:30–4:38, a local news segment 174b from 4:38–4:45, a weather report segment 174c from 4:45–4:50, a stock report segment 174d from 4:50–4:55, and a sports report segment 174e from 4:55–5:00. Therefore, if Headline News 172 were the most recent version of the repeating program, the viewer could access Headline News 172. More specifically, if the viewer were only interested in the one or more specific segments of the program, the viewer would provide input to the home entertainment system to play only the segments of interest, such as the local news segment 174b and the stock report segment 174d.

Thus the present invention is directed to systems and methods for continuously and selectively recording a repeating program to provide a viewer instant access to a recent version of the repeating program without having to wait until the next start time, and to allow the viewer to only view the specific segments of the repeating program that the viewer desires to watch. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a video recording system that is configured to receive television programming and that includes a recording medium for preserving video data that represents the television programming, a method for selectively maintaining a most recent version of a repeating television program, comprising:
   receiving input from a viewer identifying a repeating program for which a most recent version is to be maintained, wherein the repeating program corresponds with multiple versions of the repeating program that are broadcast to the video recording system, each of the multiple versions providing more current information than a previously broadcast version of the repeating program;
   receiving and recording, in entirety, a full and recent version of the repeating program at the video recording system;
   receiving and recording a more recent version of the repeating program at the video recording system; and
   upon determining that the more recent version is a full version of the repeating program, automatically discarding the recent broadcast version; and
   upon determining that the more recent version is not a full version of the repeating program, automatically discarding the more recent broadcast version.

2. A method as recited in claim 1, wherein a start broadcast time for each version of said repeating television program is scheduled on an EPG.

3. A method as recited in claim 2, wherein said more recent version of said repeating program is displayed on a television in response to viewer input selecting the more recent version to be played.

4. A method as recited in claim 3, wherein said more recent version is played from the beginning that was originally broadcast at said start broadcast time for said more recent version.

5. A method as recited in claim 3, wherein an index is overlayed on said repeating program to divide said more recent version into a plurality of segments.

6. A method as recited in claim 5, wherein said more recent version is played beginning at the beginning of one of said plurality of segments in response to said viewer input.

7. A method as recited in claim 3, wherein said repeating program is a current version of the repeating program.

8. A method as recited in claim 7, wherein said current version is played from the beginning of said current version.

9. A method as recited in claim 1, wherein said repeating program is an emergency television broadcast.

10. In a recording system that includes a tuner for receiving television programming and a recording medium for recording data associated with the television programming, wherein the data includes video and audio components, and wherein the television programming includes a repeating program, a method for recording the repeating program so as to provide a viewer instant access to the repeating program, the method comprising the acts of:
   identifying a start time of a first repeating program and a second repeating program;
   recording a current version of said first repeating program on the recording medium if a previous version of said first repeating program saved on the recording medium is less recent than a previous version of said second repeating program saved on the recording medium; and
   recording a current version of said second repeating program on the recording medium if a previous version of said second repeating program saved on the recording medium is less recent than a previous version of said first repeating program saved on the recording medium;
   receiving input from a viewer requesting access to one of said first repeating program and said second repeating program; and
   in response to said viewer input, initiating playback and display of a recent broadcast version of one of said first repeating program and said second repeating program on a display device.

11. A method as recited in claim 10, wherein said act of identifying a start time is performed by referencing EPG data.

12. A method as recited in claim 10, wherein said second repeating program is an emergency broadcast.

13. A method as recited in claim 11, wherein said recent broadcast version is played from the beginning.

14. A method as recited in claim 13, wherein said recent broadcast version is a complete version of one of said first repeating program and said second repeating program.

15. A method as recited in claim 13, wherein said recent broadcast version is a current version of one of said first repeating program and said second repeating program.

16. A recording system for association with a home entertainment system that may be implemented to continuously record a repeating television program, the recording system comprising:

a recorder for recording video data on one or more recording media, a receiver for receiving broadcast programming that is broadcast over one or more channels, and a tuner for tuning to a channel over which a repeating program is broadcast, the recording system being configured to perform a method for selectively maintaining a most recent version of the repeating television program, the method comprising:

receiving input from a viewer identifying a repeating program for which a most recent version is to be maintained, wherein the repeating program corresponds with multiple versions of the repeating program that are broadcast to the video recording system, each of the multiple versions providing more current information than a previously broadcast version of the repeating program;

receiving and recording a recent versions of the repeating television program at the video recording system;

receiving and recording a more recent version of the repeating program at the video recording system; and upon determining that the more recent version is a full version of the repeating program, automatically discarding the recent broadcast version; and upon determining that the more recent version is not a full version of the repeating program, automatically discarding the more recent broadcast version.

17. A recording system as recited in claim 16, including a second tuner coupled to said recorder for tuning to a second channel of said signal when said second tuner is in an otherwise idle state, wherein said second channel corresponds to a second repeating television program.

18. A recording system as recited in claim 16, wherein when said second tuner is no longer in an otherwise idle state, said first tuner is further used for alternating a recording of said repeating program and said second repeating television program.

19. A computer program product for implementing within a home entertainment system a method for recording a repeating program so as to provide a viewer instant access to the repeating program, wherein the computer system includes a client and a plurality of servers, the computer program product comprising:

one or more computer readable media having computer-executable instructions for implementing a method for selectively maintaining a most recent version of the repeating television program, the method comprising:

receiving input from a viewer identifying a repeating program for which a most recent version is to be maintained, wherein the repeating program corresponds with multiple versions of the repeating program that are broadcast to the video recording system, each of the multiple versions providing more current information than a previously broadcast version of the repeating program;

receiving and recording a recent versions of the repeating television program at the video recording system;

receiving and recording a more recent version of the repeating program at the video recording system; and upon determining that the more recent version is a full version of the repeating program, automatically discarding the recent broadcast version; and upon determining that the more recent version is not a full version of the repeating program, automatically discarding the more recent broadcast version.

20. A computer program product as recited in claim 19, wherein a start time for each version of said repeating program is included in EPG data.

21. A computer program product as recited in claim 20, wherein said more recent version of said repeating program is displayed on a display device in response to viewer input selecting the more recent version for display.

22. A computer program product as recited in claim 21, wherein said more recent version is played from the beginning.

23. A computer program product as recited in claim 22, wherein an index is overlayed on said repeating program to divide said more recent version into a plurality of segments.

24. A computer program product as recited in claim 23, wherein said more recent version is played starting at the beginning of one of said plurality of segments in response to said viewer input.

25. A computer program product as recited in claim 20, wherein said repeating program displayed on said display device is a current version of said repeating program.

26. A computer program product as recited in claim 25, wherein said current version is played from the beginning said current version.

27. A computer program product as recited in claim 19, wherein said repeating television program is an emergency broadcast.

28. A method as recited in claim 1, wherein upon discarding the more recent version the method further includes:

receiving and recording a full version of the repeating program that is more recent than the recent version; and discarding the recent version.

29. A computer program product as recited in claim 19, wherein upon discarding the more recent version the method further includes:

receiving and recording a full version of the repeating program that is more recent than the recent version; and discarding the recent version.

* * * * *